Patented May 22, 1945

UNITED STATES PATENT OFFICE 2,376,415

2,376,415

SYNTHESIS OF KETONES

George Brownlee, Beckenham, and Walter Mark Duffin, Dartford, England, assignors to Burroughs Wellcome & Co. (U. S. A.) Incorporated, New York, N. Y., a corporation of New York No Drawing. Application May 16, 1942, Serial No. 443,308. In Great Britain July 25, 1941

1 Claim. (Cl. 260—592)

This invention relates to the synthesis of ketones having a diethyl-stilboestrol or $\alpha\alpha'$-diethyl-dibenzyl carbon skeleton and has for its primary object the provision of methods for producing chemical substances having hormone activity.

A further object of the invention is to provide novel compounds of therapeutic and technical value.

Further objects of the invention will be apparent from the following description.

It is known that diethyl-stilboestrol has high hormonal (oestrogenic) activity, which is generally considered to be due in part to the similarity in spacial structure between this substance and the naturally occurring hormones oestrone and oestriol. We have now discovered by research and experiment that ketones derived from the same carbon skeleton as diethyl-stilboestrol, $\alpha\alpha'$-diethyl-stilbene and $\alpha\alpha'$-diethyl-dibenzyl (dihydrodiethyl-stilboestrol) are also active hormones. The present invention comprises methods hereinafter described whereby such ketones may be synthesised. The invention includes the ketones themselves when made by the processes herein described and claimed, or by obvious chemical equivalents of such methods, and derivatives obtained from the said ketones (when so made) by commonly known chemical methods.

In referring to the carbon skeleton aforesaid we mean the linked carbon atoms of the two benzene rings and the short branched alkyl chain joining the said rings, together with the hydrogen atoms attached to said carbon atoms insofar as such hydrogen atoms are not replaced by other substituents.

The invention comprises a process for the manufacture of ketones having a diethyl-stilboestrol or $\alpha\alpha'$-diethyl-dibenzyl carbon skeleton which comprises reacting a suitable compound having the aforesaid carbon skeleton with an aliphatic acid, acid anhydride or acid halide under such conditions that one or more —CO.R groups (wherein R is alkyl or substituted alkyl) are introduced into one or both of the benzene rings.

According to one process in accordance with the invention one or more acid residues are introduced by means of the Friedel-Crafts or similar reaction (that is to say, by heating with anhydrous aluminium, antimony, zinc, ferric or cadmium chloride or aluminium bromide) into a suitable starting material having the required carbon skeleton, namely the carbon skeleton of $\alpha\alpha'$-diethyl-stilbene or $\alpha\alpha'$-diethyl-dibenzyl, by the use of acids, acid anhydrides or acid halides.

Alternatively, according to the invention, aliphatic esters of phenols having the required carbon skeleton are heated with aluminium chloride, zinc chloride or like condensing agent whereby the acyl group or groups is or are displaced from the phenolic hydroxyl into the benzene ring, or rings. It is not necessary that the esters should be pre-formed, it is sufficient to heat the phenol together with the acid, acid halide or acid anhydride and the condensing agent.

Where the starting material having the aforesaid carbon skeleton is a phenol containing one or more free hydroxyl groups it is possible to esterify this or these simultaneously with introduction of a ketone group elsewhere into the molecule.

The compounds produced according to the invention have the carbon skeleton aforesaid with one or more —CO.R groups (where R is an alkyl group) introduced into either or both of the benzene rings.

The hormonal activity of the ketones in question is greatest when one or more of the substituents is or are in the 4 and/or 4' positions. some other group convertible to hydroxyl or hydroxyl itself is present in or is introduced into the 4 position and a hydroxy or ketone group is present in or is introduced into the 4' position.

If the acid, acid chloride, or acid anhydride or the ester which is employed itself has one or more of its hydrogen atoms replaced by halogen or hydroxyl, the —CO.R groups introduced will likewise contain those substituents, R now being a substituted alkyl group.

Thus, for example, the use of chloracetyl chloride leads to the introduction of the grouping —CO.CH$_2$Cl, and acetyl-glycollyl chloride the grouping —CO.CH$_2$OH.

The halogen substituted ketones, we have found by research and experiment, may be reduced to give the unsubstituted ketones above described or may be hydrolysed to give the ketones having hydroxyl as a substituent, which are also described above.

Thus, by way of illustration, the ketones comprising the carbon skeleton above specified together with a chloracetyl group attached to one of the benzene rings may be reduced, for example, by means of hydrogen in the presence of palladium-charcoal as catalyst, to give the corresponding methyl ketone, or may be hydrolysed, for example, by alcoholic potash, to give the corresponding hydroxy-ketone.

The various ketonic products made according to our invention may be isolated in each case by the use of reagents for ketones, such as Girard's reagents (Helv. Chim. Acta., 1936, 19, 1095–1107), semi-carbazide and the like.

By way of illustration of the methods and products of our invention the following specific examples will now be given.

Examples 1. 10 grammes p.methoxy-$\alpha\alpha'$-diethyldibenzyl is treated with 3.7 ccs. acetic anhydride in nitrobenzene and 12.3 grammes coarsely powdered anhydrous aluminium chloride added gradually.

When addition is complete, the whole is heated on the water-bath for 1 hour. Water is then cautiously added and the product extracted with chloroform. The chloroform extract is submitted to steam distillation to remove the nitrobenzene and the residue again extracted with chloroform. The chloroform extract is evaporated to dryness and the residue extracted with alcohol. The insoluble part has progesterone-like activity and may be purified by treatment with Girard reagent "P." The ketonic fraction is obtained by hydrolysis of the condensation product as a black resinous material, which contains as its active constituent 4-methoxy-4'-acetyl-αα'-diethyl-dibenzyl.

2. 5 grammes p.methoxy-αα'-diethyldibenzyl is treated with 1.2 ccs. acetyl chloride in carbon disulphide and 2.8 g. coarsely powdered anhydrous aluminium chloride gradually added. When the reaction has subsided, the mixture is heated on the water-bath for half an hour. After cooling, water is added and the product extracted with chloroform. The chloroform extract is evaporated and the ketone isolated from the product by the use of Girard reagent or semi-carbazide. The ketone is the same as that produced by the process of Example 1.

3. 17 grammes diethylstilboestrol diacetate is ground with 4.5 g. anhydrous aluminium chloride and heated in oilbath at 140° C. for 30 minutes. The product is decomposed with ice water and extracted with ether, the ethereal extract being then washed with normal NaOH (from the ether 9 g. unchanged diethylstilboestrol diacetate is recovered on evaporation). The alkali solution and any precipitate formed, are made acid and extracted with ether. The residue obtained on evaporation of the ether is crystallised from methylene dichloride, benzene or 50% alcohol, yielding a white solid M. P. 146–8° having oestrogenic properties. This solid is 4,4'-dihydroxy-diacetyl-αα'-diethylstilbene.

4. 5 grammes diethylstilboestrol mono-methyl ether is ground with 2.5 grammes anhydrous zinc chloride, and heated with 0.75 cc. acetyl chloride in an oilbath at 100° C. for 5 hours. After cooling, water is added and the product extracted with chloroform. From the oily residue obtained on evaporation of the chloroform, the ketonic fraction (having oestrogenic activity) is obtained as a brown oil by the use of Girard reagent. The active ketone is 4-methoxy-4'-hydroxy-3'-acetyl-αα'-diethylstilbene.

5. 20 grammes of p-methoxy-αα'-diethyldibenzyl is treated with 6.8 ccs. of mono-chloracetyl chloride in carbon disulphide and 18.6 grammes powdered anhydrous aluminium chloride gradually added. When the reaction has subsided, the mixture is heated on the water-bath for half an hour. After cooling, water is added and the product extracted with chloroform. The chloroform extract is evaporated and the residue crystallised from methyl alcohol, a white solid M. P. 139–141° being obtained, having progesterone-like activity. This is the ketone 4-methoxy-4'-monochloracetyl-αα'-diethyldibenzyl.

By the use of the di- and tri-chloracetyl chlorides, the corresponding di- and tri-chloracetyl ketones may be prepared.

6. 20 grammes of p-methoxy-αα'-diethyldibenzyl is treated with 12 grammes acetylglycollyl chloride in carbon disulphide, 18.6 grammes coarsely powdered anhydrous aluminium chloride added, and the mixture heated on the water-bath for half an hour. After cooling, water is added and the product extracted with chloroform. The chloroform extract is evaporated and the residue crystallised from methyl alcohol, a white solid being obtained, having corticosterone-like activity, and the composition 4-methoxy-4'-glycollyl-αα'-diethyldibenzyl.

7. 1 gramme of the chloro-compound M. P. 139–141° obtained by Friedel-Crafts reaction between p-methoxy-αα'-diethyldibenzyl and monochloracetyl chloride as described in Example 5 is shaken with 50 ccs. acetone and 2 grammes palladium-charcoal catalyst (prepared by reducing an aqueous solution of 0.1 gramme palladium chloride with hydrogen in the presence of 2 grammes charcoal) in hydrogen until no more is absorbed, the catalyst filtered off and the acetone solution evaporated to dryness. On crystallisation from ethyl alcohol the methyl ketone is obtained as a white solid M. P. 135–6° having progesterone-like activity.

8. 1 gramme of the chloro-compound employed in Example 7 treated with 2 grammes of potassium hydroxide and 20 ccs. alcohol under reflux for 24 hours and the product poured into water. By extraction with ether the compound 4-methoxy-4'-glycollyl-αα'-diethyl-dibenzyl is obtained as an oil which solidifies on standing. The aqueous liquor is acidified and again extracted with ether and this ethereal extract, after washing with sodium carbonate solution to free it from acidic bodies, is evaporated to a colourless oil which may be crystallised from methyl alcohol as a white solid. Both products have corticosterone-like activity.

9. 10 grammes 4-hydroxy-αα'-diethyldibenzyl, dissolved in a mixture of 50 ccs. carbon disulphide and 13 ccs. mono-chloracetyl chloride, was poured on to 10.3 g. powdered anhydrous aluminium chloride, and when the initial reaction had subsided the mixture was heated on the water-bath for an hour. The supernatant liquor was decanted and the residue, after decomposition with water, extracted with carbon tetrachloride. The extract, after washing with water and dilute sodium carbonate solution to remove acid, was dried over magnesium sulphate and concentrated to crystallize. 5.6 g. of the ester ketone 4'-mono-chloracetyl-αα'-diethyldibenzyl-(4)-monochloracetate separated out as a grey solid which was obtained colourless (M. P. 135–6°) by recrystallization from methyl alcohol. Further crops were obtained from the mother liquors. The product had some progesterone-like activity.

As will be readily understood by those skilled in the art the foregoing specific description is only illustrative of the invention and variations may be made in the materials and procedures employed within the scope of the appended claim.

What we claim is:

A new composition of matter comprising a ketone consisting of a compound selected from the group consisting of 4-methoxy-4'-acetyl-αα'-diethyl-dibenzyl, 4,4'-dihydroxy-3,3'-diacetyl-αα'-diethyl-stilbene, 4-methoxy-4'-hydroxy-3'-acetyl-αα'-diethyl-stilbene, 4-methoxy-4'-monochloracetyl-αα'-diethyl-dibenzyl, 4-methoxy-4'-dichloracetyl-αα'-diethyl-dibenzyl, 4-methoxy-4'-trichloracetyl-αα'-diethyl-dibenzyl, 4-methoxy-4'-glycollyl-αα'-diethyl-dibenzyl and 4'-monochloracetyl-αα'-diethyl-dibenzyl monochloracetate.

WALTER MARK DUFFIN.
GEORGE BROWNLEE.